(12) United States Patent
Tsuei et al.

(10) Patent No.: US 10,380,972 B2
(45) Date of Patent: Aug. 13, 2019

(54) DISPLAY DEVICE

(71) Applicant: INNOLUX CORPORATION, Miao-Li County (TW)

(72) Inventors: Bo-Chin Tsuei, Miao-Li County (TW); Hsia-Ching Chu, Miao-Li County (TW); Ming-Chien Sun, Miao-Li-County (TW)

(73) Assignee: INNOLUX CORPORATION, Miao-Li County (TW)

( * ) Notice: Subject to any disclaimer, the term of this patent is extended or adjusted under 35 U.S.C. 154(b) by 133 days.

(21) Appl. No.: 15/394,900

(22) Filed: Dec. 30, 2016

(65) Prior Publication Data

US 2017/0193966 A1 Jul. 6, 2017

(30) Foreign Application Priority Data

Jan. 5, 2016 (TW) .............................. 105100139 A

(51) Int. Cl.

| G09G 5/10 | (2006.01) |
|---|---|
| G02F 1/1333 | (2006.01) |
| G02F 1/1343 | (2006.01) |
| G02F 1/1362 | (2006.01) |
| G09G 3/36 | (2006.01) |

(52) U.S. Cl.
CPC ......... *G09G 5/10* (2013.01); *G02F 1/133345* (2013.01); *G02F 1/134309* (2013.01); *G02F 1/136209* (2013.01); *G02F 1/136286* (2013.01); *G09G 3/3607* (2013.01); *G02F 2201/52* (2013.01); *G09G 2320/0626* (2013.01); *G09G 2320/08* (2013.01)

(58) Field of Classification Search
CPC ............. G09G 5/10; G09G 2320/0626; G09G 2320/08; G09G 2320/0686; G02F 1/134309; G02F 1/136286; G02F 1/1368; G02F 1/3556; G02F 2201/52; G02F 2201/123; G02F 2201/124; G02F 2001/136281; G02F 2202/10; G02F 2202/103; G02F 2202/104; G02F 1/133512; G02F 1/136209
See application file for complete search history.

(56) References Cited

U.S. PATENT DOCUMENTS

| 2006/0102905 A1* | 5/2006 | Park ................... G02F 1/133512 257/72 |
|---|---|---|
| 2016/0210923 A1* | 7/2016 | Yoshida ............... G09G 3/3677 |
| 2016/0342047 A1* | 11/2016 | Song ................... H01L 27/1222 |
| 2017/0146832 A1* | 5/2017 | Song ................... G02F 1/13725 |

* cited by examiner

*Primary Examiner* — Angela K Davison
(74) *Attorney, Agent, or Firm* — Bacon & Thomas, PLLC

(57) ABSTRACT

A display device is disclosed, which comprises: a substrate; a semiconductor layer disposed on the substrate; a second electrode layer disposed over the semiconductor layer and comprising first data lines extending along a second direction; and plural pixel regions disposed between two adjacent first data lines. Herein, one pixel region has a first section and a second section substantially parallel to the second direction, respectively. The first section overlaps with the semiconductor layer, but the second section does not overlap therewith. When light passes through the display device, a ratio of a first brightness integral value obtained by measuring the first section to a second brightness integral value obtained by measuring the second section is greater than 0.4 and smaller than 1.

13 Claims, 16 Drawing Sheets

DISPLAY DEVICE

CROSS REFERENCE TO RELATED APPLICATION

This application claims the benefits of the Taiwan Patent Application Serial Number 105100139, filed on Jan. 5, 2016, the subject matter of which is incorporated herein by reference.

BACKGROUND OF THE DISCLOSURE

1. Field of the Disclosure

The present disclosure relates to a display device. More particularly, the present disclosure relates to a display device that has good transmittance or good contrast.

2. Description of Related Art

As display technology advances, all display panels are now being developed in smaller sizes with thinner thicknesses and lighter weights. As a result, the mainstream display devices in the market have changed from the previous cathode ray tube to the current thin displays, such as liquid crystal display panels, organic light emitting diode display panels, or inorganic light emitting diode display panels. Thin displays can be applied in many fields. For example, most of the display panels used in daily life, such as mobile phones, laptop computers, video cameras, cameras, music players, mobile navigation devices, and televisions, use the aforesaid display panels.

Among the aforesaid display panels, the technology of liquid crystal display panels is very mature; thus, liquid crystal display panels are one of the common display panels in the market. However, as the development of display panels advances, the demand of consumers for display panels with higher display quality also increases. Hence, all manufacturers are actively aiming to develop display panels with higher display quality.

In the development of liquid crystal display panels, for high-resolution display panels, two of the important factors affecting display quality of display panels are transmittance and contrast. Therefore, all manufacturers are actively improving the transmittance and contrast of display panels to enhance the display quality of display panels.

Accordingly, there is a need to develop a display device that can have both good transmittance and contrast in order to meet the current demand for higher display quality.

SUMMARY OF THE DISCLOSURE

The main object of the present disclosure is to provide a display device that has good transmittance and contrast, and thus, has increased display quality. Specifically, the light transmission through the active layer region of display devices has been adjusted to balance the transmittance and contrast of display devices.

In the present disclosure, an embodiment of the display panel comprises: a substrate; a semiconductor layer disposed on the substrate; a first insulation layer disposed on the semiconductor layer; a first electrode layer disposed on the first insulation layer, wherein the first electrode layer has plural first gate lines extending along a first direction; a second insulation layer disposed on the first electrode layer; a second electrode layer disposed on the second insulation layer, wherein the second electrode layer has plural first data lines extending along a second direction, and the first direction and the second direction are different; and a plurality pixel regions defined by the first gate lines and the first data lines. Herein, a first reference line and a second reference line are defined to be located in one of the pixel regions, the first reference line and the second reference line are substantially parallel to the second direction respectively; wherein the first reference line is defined to have a first section overlapped with the semiconductor layer, the second reference line is defined to have a second section not overlapped with the semiconductor layer, each of the first section and the second section has a same distance from the first gate line, and a length of the first section equals to a length of the second section; wherein when a light passes through the display device, the first section corresponds to a first section brightness and the second section corresponds to a second section brightness, the first section brightness has a first brightness integral value and the second section brightness has a second brightness integral value, and a ratio of the first brightness integral value to the second brightness integral value is greater than 0.4 and less than 1.

In the present disclosure, another embodiment of the display device comprises: a substrate; a semiconductor layer disposed on the substrate; a first insulation layer disposed on the semiconductor layer; a first electrode layer disposed on the first insulation layer, wherein the first electrode layer has plural first gate lines extending along a first direction; a second insulation layer disposed on the first electrode layer; a second electrode layer disposed on the second insulation layer, wherein the second electrode layer has plural first data lines extending along a second direction, and the first direction and the second direction are different; and a plurality of pixel regions defined by the first gate lines and the first data lines; wherein one of the pixel regions is defined to have a first section and a second section, the first section is substantially parallel to the second direction and the first section overlaps with the semiconductor layer, the second section is substantially parallel to the second direction and the second section does not overlap with the semiconductor layer, each of the first section and the second section has a same distance from the first gate lines, and a length of the first section equals to a length of the second section; wherein when a light passes through the display device, the first section corresponds to a first section brightness and the second section corresponds to a second section brightness, the first section brightness has a first brightness integral value and the second section brightness has a second brightness integral value, and a ratio of the first brightness integral value to the second brightness integral value is greater than 0.4 and less than 1.

In the present disclosure, another embodiment of the display panel comprises: a substrate; a patterned light shielding layer disposed on the substrate; a semiconductor layer disposed on the patterned light shielding layer, wherein the semiconductor layer is overlapped with the patterned light shielding layer partially; a first insulation layer disposed on the semiconductor layer; a first electrode layer disposed on the first insulation layer, wherein the first electrode layer has plural first gate lines extending along a first direction; a second insulation layer disposed on the first electrode layer; a second electrode layer disposed on the second insulation layer, wherein the second electrode layer has plural first data lines extending along a second direction, and the first direction and the second direction are different; and a plurality of pixel regions defined by the first gate lines and the first data lines. Herein, a first reference line and a second reference line are defined to be located in one of the pixel region, the first reference line and the second reference line are substantially parallel to the second direction respectively; wherein the first reference line is defined to have a first section overlapped with the semiconductor layer but not overlapped with the patterned light shielding layer, the second imaginary line is defined to have a second section not overlapped with the semiconductor layer and the patterned light shielding layer, each of the first section and the second section has a same distance from the first gate line, and a length of the first section equals to a length of the second section; wherein when a light passes through the display device, the first section corresponds to a first section brightness and the second section corresponds to a second section brightness, the first section brightness has a first brightness integral value and the second section brightness has a second brightness integral value, and a ratio of the first brightness integral value to the second brightness integral value is greater than 0.4 and less than 1.

In the present disclosure, another embodiment of the display device comprises: a substrate; a patterned light shielding layer disposed on the substrate; a semiconductor layer disposed on the patterned light shielding layer, wherein the semiconductor layer is overlapped with the patterned light shielding layer partially; a first insulation layer disposed on the semiconductor layer; a first electrode layer disposed on the first insulation layer, wherein the first electrode layer has plural first gate lines extending along a first direction; a second insulation layer disposed on the first electrode layer; a second electrode layer disposed on the second insulation layer, wherein the second electrode layer has plural first data lines extending along a second direction, and the first direction and the second direction are different; and a plurality of pixel regions defined by the first gate lines and the first data lines; wherein one of the pixel regions is defined to have a first section and a second section, the first section is substantially parallel to the second direction and the first section overlaps with the semiconductor layer but does not overlap with the patterned light shielding layer, the second section is substantially parallel to the second direction and the second section does not overlap with the semiconductor layer and the patterned light shielding layer, each of the first section and the second section has a same distance from the first gate lines, and a length of the first section equals to a length of the second section; wherein when a light passes through the display device, the first section corresponds to a first section brightness and the second section corresponds to a second section brightness, the first section brightness has a first brightness integral value and the second section brightness has a second brightness integral value, and a ratio of the first brightness integral value to the second brightness integral value is greater than 0.4 and less than 1.

In the display devices provided by the present disclosure, the first section, which overlaps with the semiconductor layer, has a first brightness integral value. The second section, which does not overlap with the semiconductor layer, has a second brightness integral value. The first brightness integral value is smaller than the second brightness integral value. More specifically, the ratio of the first brightness integral value to the second brightness integral value is greater than 0.4 but less than 0.1. Under the aforesaid condition, the front view transmittance of the display devices provided by the present disclosure can be increased within a range in which the contrast can be decreased to a tolerable level. Consequently, the display quality of the display devices provided by the present disclosure can be enhanced.

Other objects, advantages, and novel features of the present disclosure will become more apparent from the following detailed description when taken in conjunction with the accompanying drawings.

DETAILED DESCRIPTION OF THE EMBODIMENT

The present disclosure has been described in an illustrative manner. It is to be understood that the terminologies used are intended to be in the nature of description rather than of limitation. Many modifications and variations of the present disclosure are possible in light of the above teachings. Therefore, it is to be understood that within the scope of the appended claims, the disclosure may be practiced otherwise than as specifically described.

In addition, terms such as "first" and "second" in the specification and claims are only intended to make clear distinction of elements with the same name. These terms do not mean these elements are used or manufactured in any sequence.

Example 1

Figure 1:
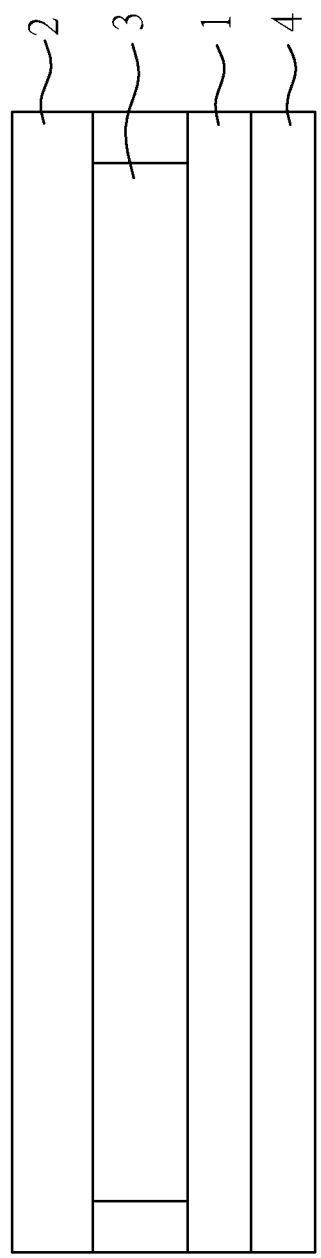
FIG. 1 is a cross-sectional view of a display device of Example 1 of the present disclosure.

Please refer to FIG. 1. FIG. 1 is a cross-sectional view of a display device of the present example. As shown in FIG. 1, the display device of the present example comprises: a substrate 1; a counter substrate 2 disposed opposite to the substrate 1; and a display layer 3 disposed between the substrate 1 and the counter substrate 2; and a backlight module 4 disposed under the substrate 1 of the display device. In the present example, the substrate 1 can be a thin film transistor substrate, in which thin film transistor structures (not shown) are disposed on the substrate 1. The counter substrate 2 can be a color filter substrate in which a color filter layer (not shown) and a black matrix layer (not shown) are disposed on the counter substrate 2. However, in other examples of the present disclosure, the substrate 1 can also be a thin film transistor substrate integrated with a color filter array (color filter on array, COA), in which a color filter layer (not shown) is also disposed on the substrate 1. The substrate 1 can also be a thin film transistor substrate integrated with a black matrix layer (black matrix on array, BOA), in which a black matrix layer (not shown) is also disposed on the substrate 1. In addition, in the display device of the present example, the display layer 3 is a liquid crystal layer. Next, the structural features of the elements disposed on the substrate 1 will be described in detail.

Figure 2:
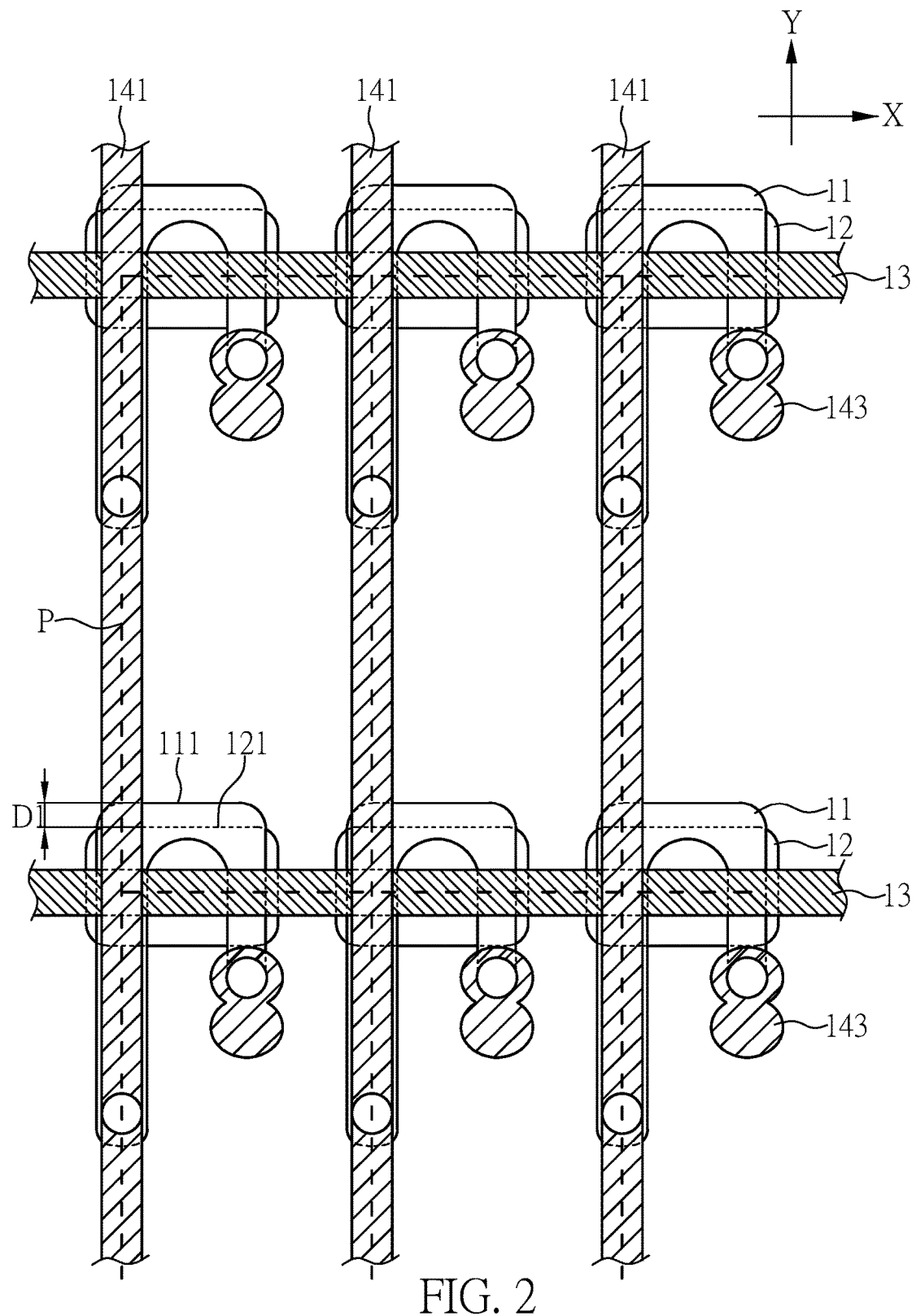
FIG. 2 is a top view of the elements on the substrate of a display device of Example 1 of the present disclosure.

Please refer to FIG. 1 and FIG. 2. FIG. 2 is a top view of the elements on the substrate of a display device of the present example. As shown in FIG. 1 and FIG. 2, a display device of the present example comprises: a substrate 1; a patterned light shielding layer 12 disposed on the substrate 1; a semiconductor layer 11 disposed on the patterned light shielding layer 12, wherein the semiconductor layer 12 is overlapped with the patterned light shielding layer 12 partially, and the patterned light shielding layer 12 is electrically insulated from the semiconductor layer 11; a first insulation layer (not shown) disposed on the semiconductor layer 11 (since the first insulation layer is formed on the entire surface of the substrate 1 and since the top view shown in FIG. 2 has no borders; thus, the first insulation layer is not shown in FIG. 2); a first electrode layer disposed on the first insulation layer (not shown), wherein the first electrode layer has plural first gate lines 13 extending along a first direction X; a second insulation layer (not shown) disposed on the first electrode layer (since the second insulation layer is formed on the entire surface of the substrate 1 and since the top view shown in FIG. 2 has no borders; thus, the second insulation layer is not shown in FIG. 2); a second electrode layer disposed on the second insulation layer (not shown), wherein the second electrode layer has plural first data lines 141 extending along a second direction Y as well as plural electrode pads 143, wherein the first direction X and the second direction Y are different; and plural pixel regions P disposed in regions defined by the first gate lines 13 and the first data lines 141. The semiconductor layer 11 has a semiconductor layer edge 111, the patterned light shielding layer 12 has a light shielding edge 121, and a distance D1 between the semiconductor layer edge 111 and the light shielding edge 121 may be between 2 µm and 10 µm. The semiconductor layers 11, the first data lines 141 and the first gate lines 13 form plural thin-film transistor (not show in the figure).

Herein, the substrate 1 may be manufactured by any substrate materials, such as glass, plastics, flexible materials or thin films. When the substrate 1 is manufactured by plastic, flexible materials or thin films, the display device of the present example can be a flexible display device. The semiconductor layer 11 may be a low temperature polycrystalline silicon semiconductor layer. The first insulation layer and the second insulation layer may be manufactured by any insulation materials, such as oxides, nitrides, or nitrogen oxides. The patterned light shielding layer 12, the first electrode layer, and the second electrode layer may be manufactured by any conductive materials, such as metals, alloys, metal oxides, metal nitrogen oxides, or other electrode materials. However, in other examples of the present disclosure, the materials of the aforesaid elements are not limited thereto.

Figure 3:
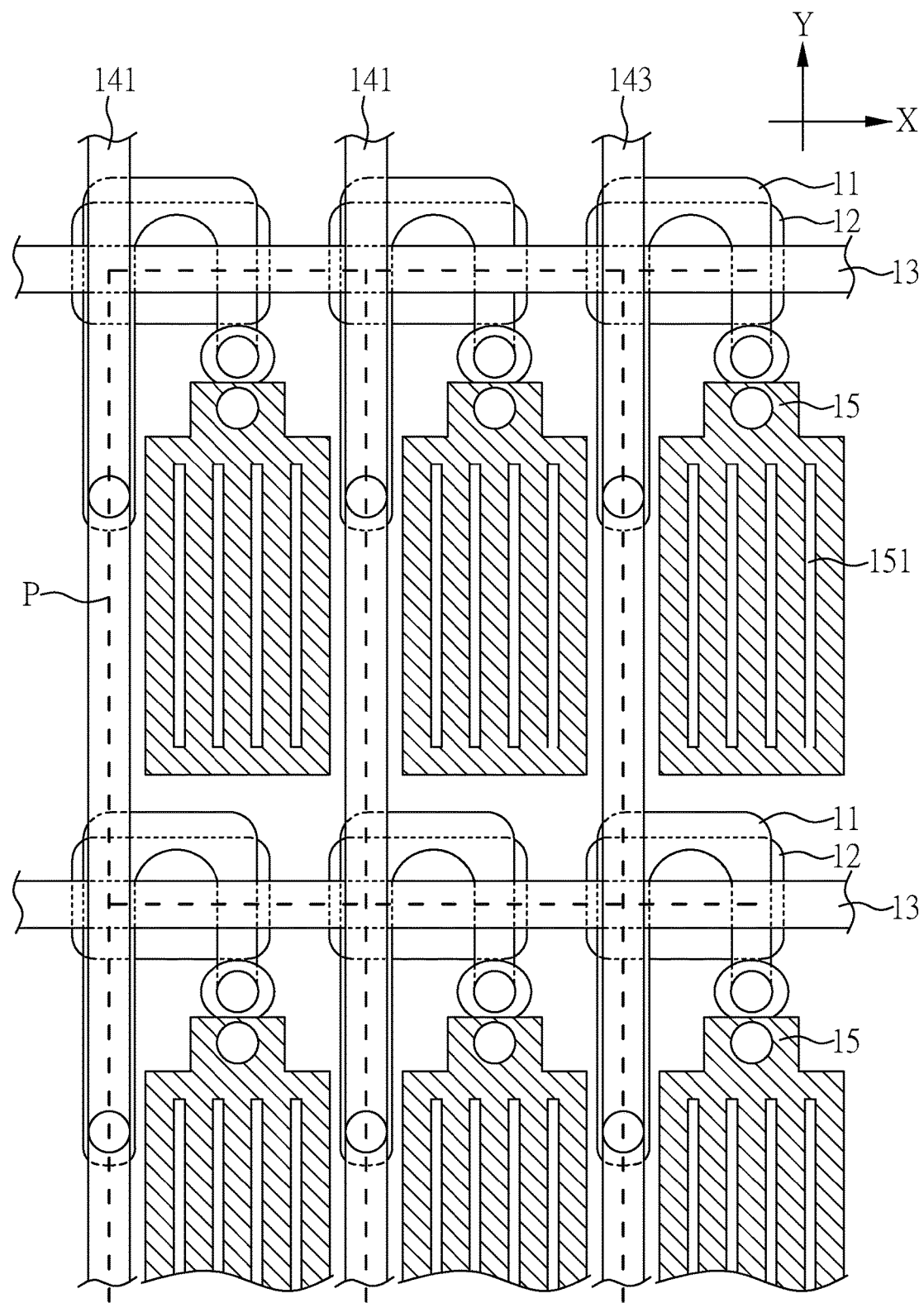
FIG. 3 is a top view of the elements on the substrate of a display device of Example 1 of the present disclosure.

Please refer to FIG. 2 and FIG. 3. FIG. 3 is another top view of the elements on the substrate of a display device of the present example. Herein, the hatch lines of the same elements in both FIG. 2 and FIG. 3 are omitted in FIG. 3 for clearer description. As shown in FIG. 2 and FIG. 3, in the display device of the present example, a pixel electrode 15 is disposed correspondingly to each pixel region P. The pixel electrode 15 is electrically connected to the electrode pad 143. Since the pixel electrode 15 has plural slits 151, the pixel electrode 15 appears to have a comb structure. Herein, the pixel electrode 15 may be manufactured by any transparent conductive electrode materials, such as ITO, IZO, or ITZO. However, in other examples of the present disclosure, the material of the pixel electrode 15 is not limited thereto.

Figure 4:
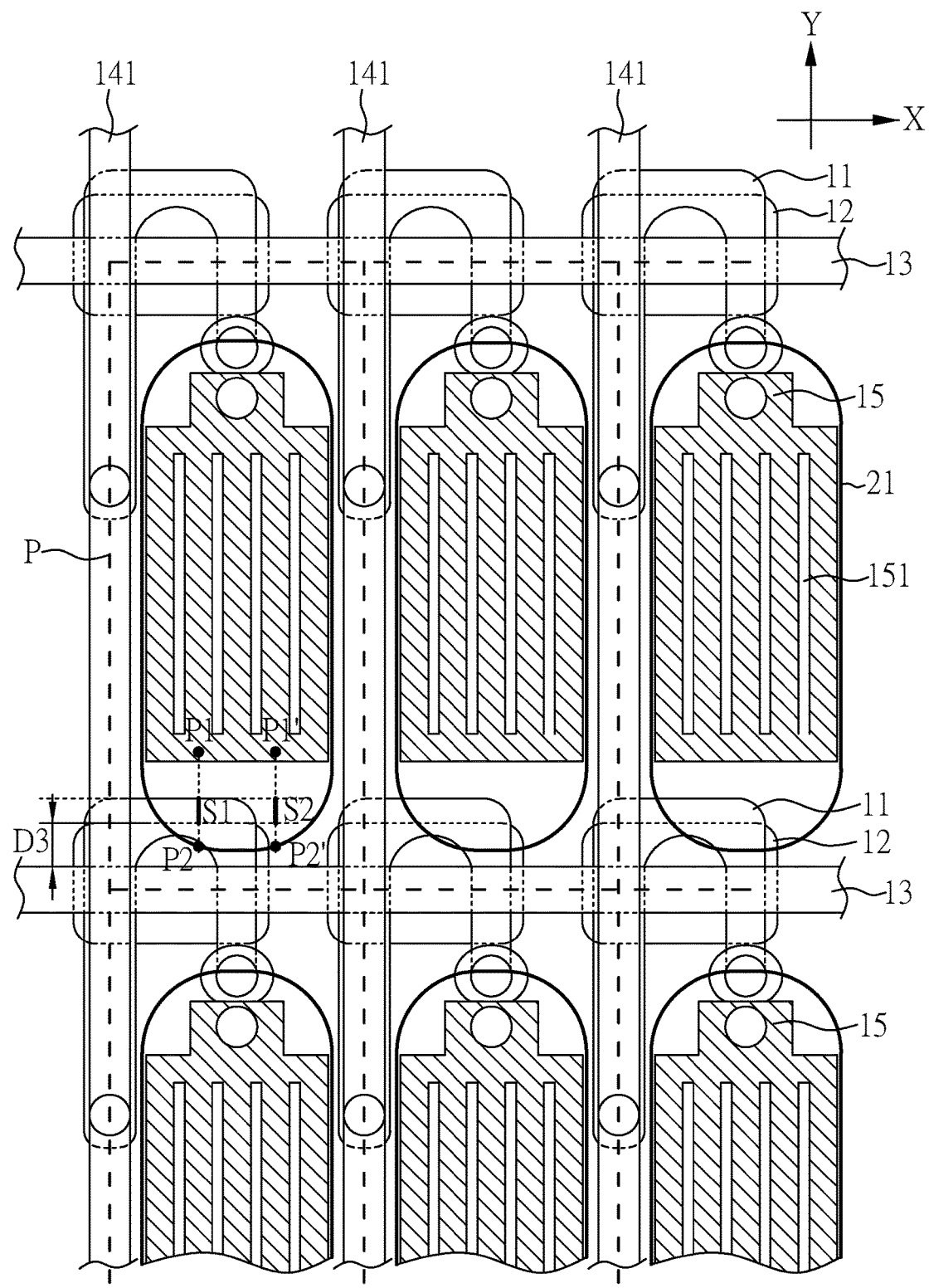
FIG. 4 is a top view of the elements on the substrate and the black matrix layer on the counter substrate of a display device of Example 1 of the present disclosure.

Please refer to FIG. 1 and FIG. 4. As shown in FIG. 1, in the present example, the counter substrate 2 is a color filter substrate in which a color filter (not shown) and a black matrix layer (not shown) are disposed on the counter substrate 2. After the substrate 1 and the counter substrate 2 are assembled, the relative arrangement of the elements on the substrate 1 and the black matrix layer on the counter substrate 2 is shown in FIG. 4. FIG. 4 is a top view of the elements on the substrate and the black matrix layer on the counter substrate of a display device of the present example. As shown in FIG. 4, the black matrix layer has plural openings 21. Each opening 21 corresponds to one pixel region P to expose a part of one pixel electrode 15 or one whole pixel electrode 15.

Example 2

Figure 5:
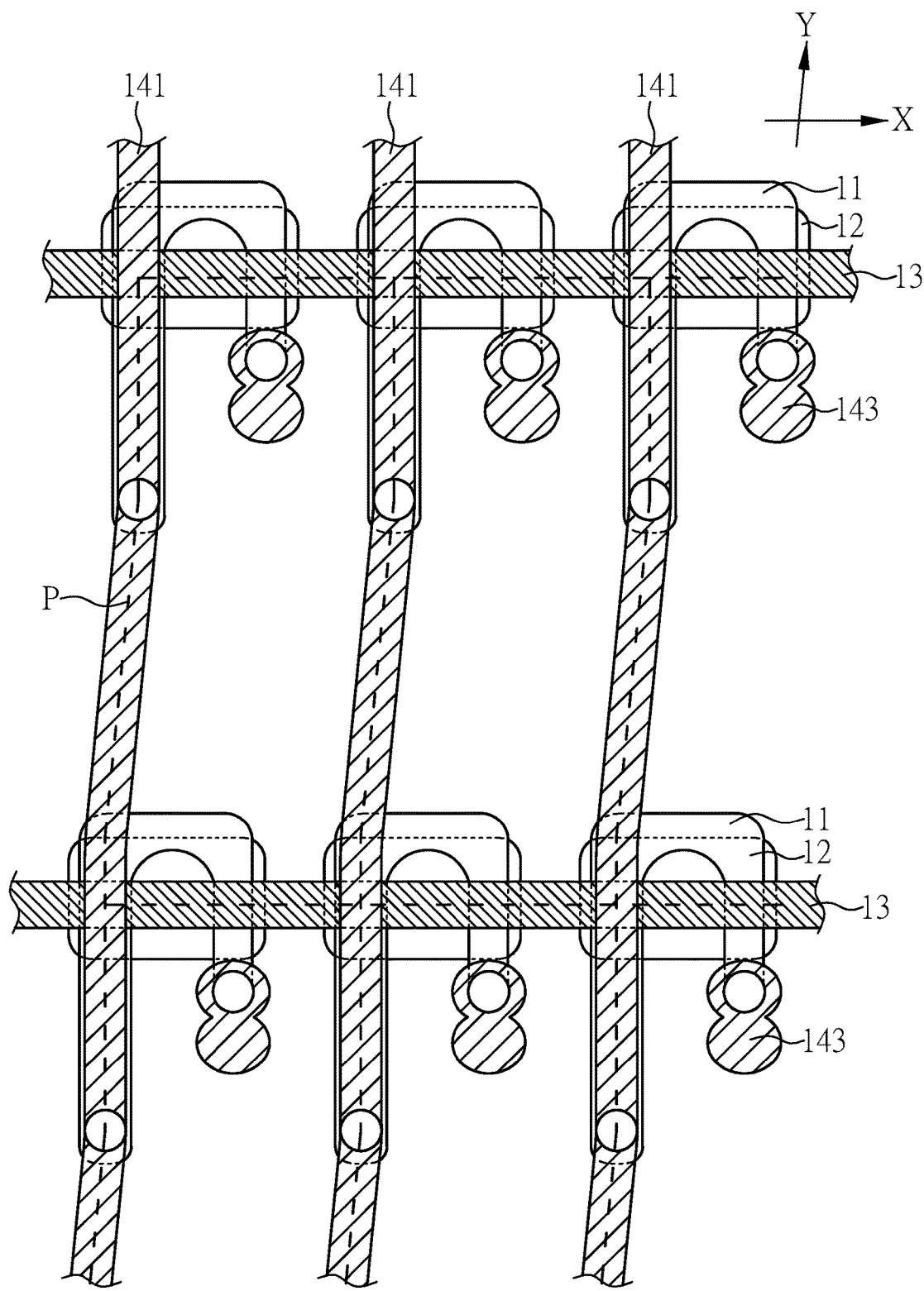
FIG. 5 is a top view of the elements on the substrate of a display device of Example 2 of the present disclosure.
Figure 6:
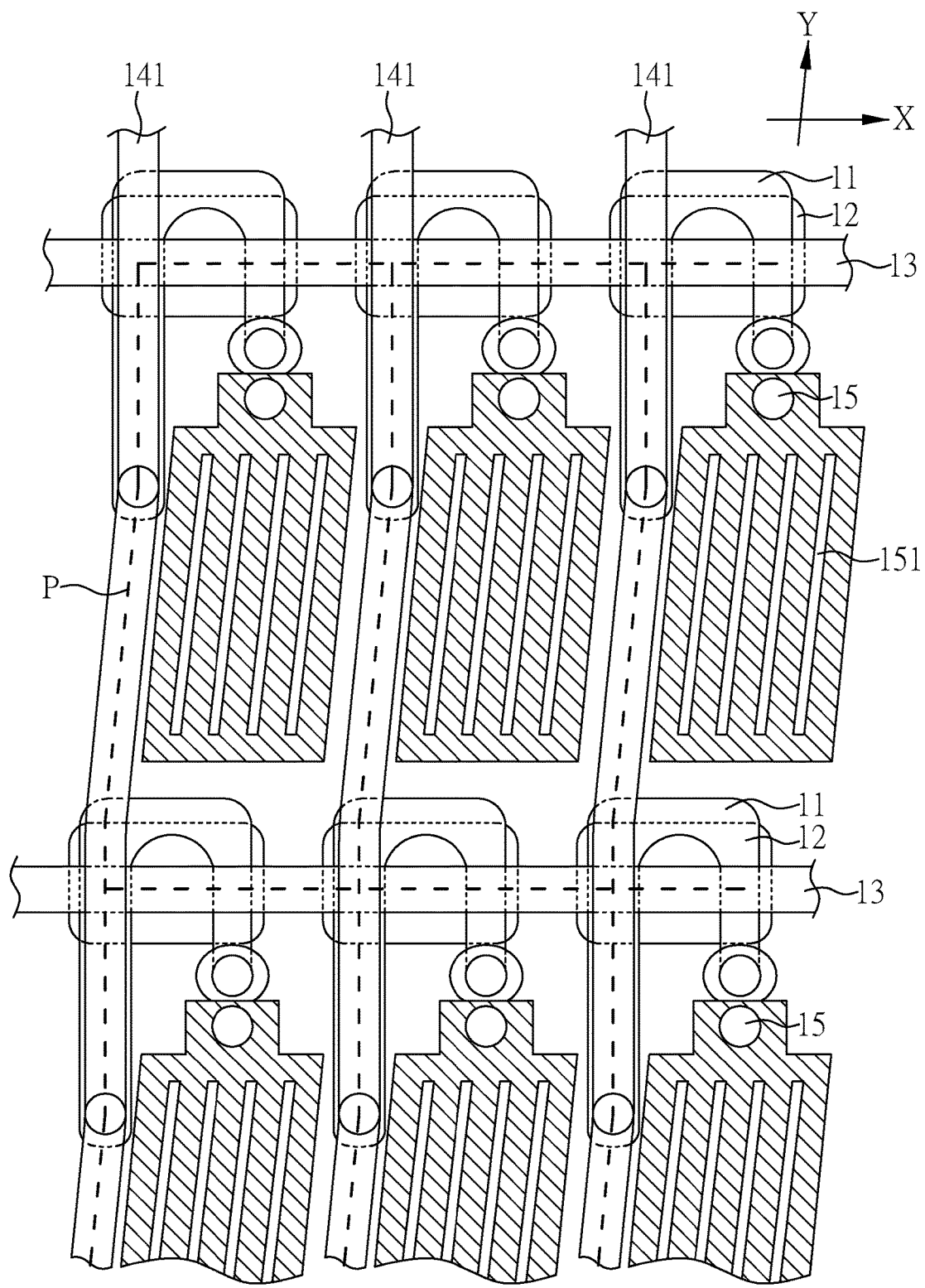
FIG. 6 is a top view of the elements on the substrate of a display device of Example 2 of the present disclosure.
Figure 7:
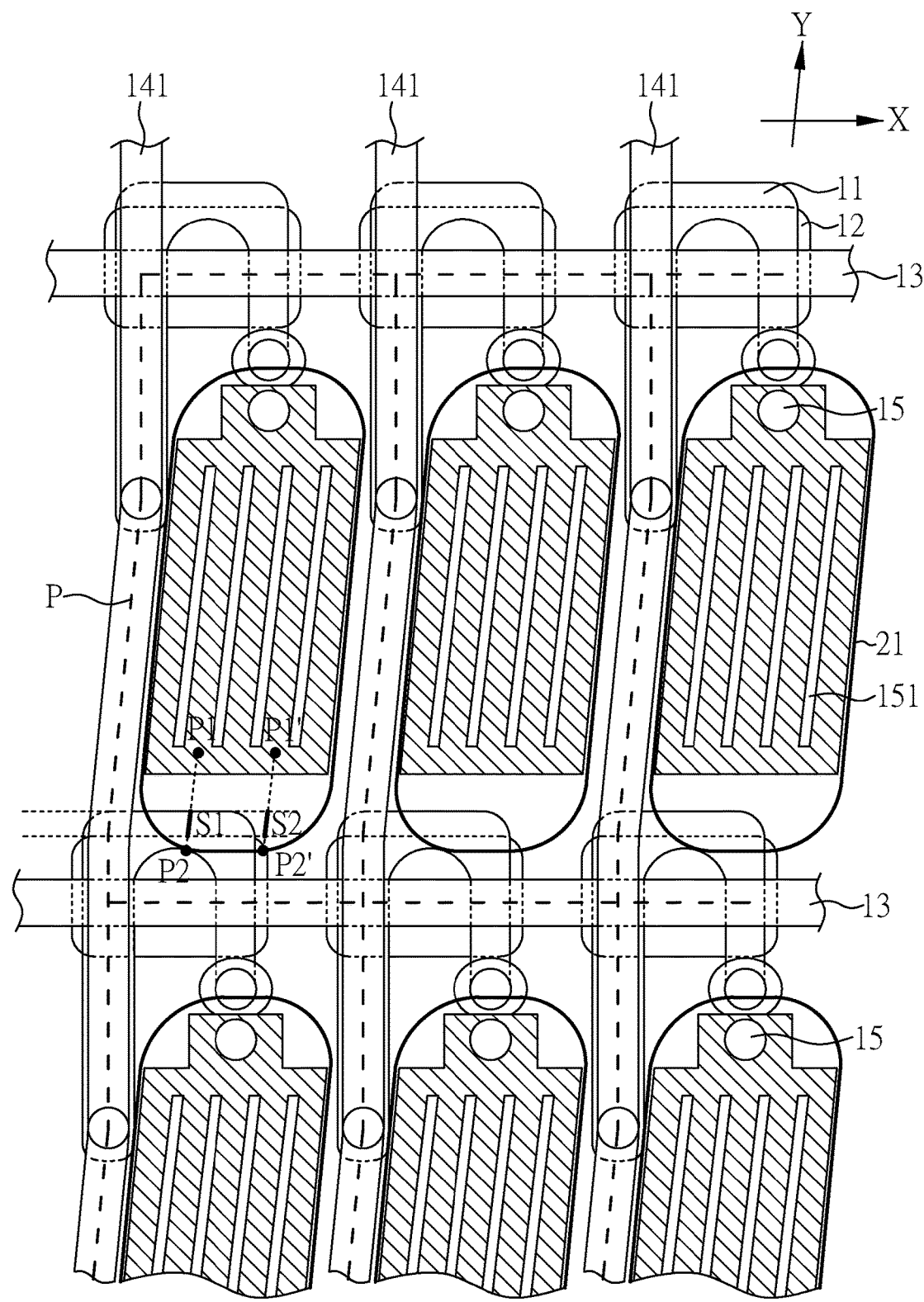
FIG. 7 is a top view of the elements on the substrate and the black matrix layer on the counter substrate of a display device of Example 2 of the present disclosure.

Please refer to FIG. 5, FIG. 6, and FIG. 7. FIG. 5 and FIG. 6 are top views of the elements on the substrate of a display device of the present example. FIG. 7 is a top view of the elements on the substrate and the black matrix layer on the counter substrate of a display device of the present example. Herein, FIGS. 5-7 and FIGS. 2-4 of Example 1 are the same views, respectively.

Comparing FIGS. 2-4 of Example 1 and FIGS. 5-7 of the present example, the display devices and the display devices of Example 1 and that of the present example are similar except of the following. In Example 1, the direction in which the first gate lines 13 extend (i.e. the first direction X) and the direction in which the first data lines 141 extend (i.e. the second direction Y) are perpendicular. However, in the present example, the direction in which the first gate lines 13 extend (i.e. the first direction X) and the direction in which the first data lines 141 (i.e. the second direction Y) are not perpendicular. In addition, in the present example, as shown in FIG. 6, the second direction Y is also the lengthwise direction of the slits 151 of the pixel electrodes 15.

Example 3

Figure 8:
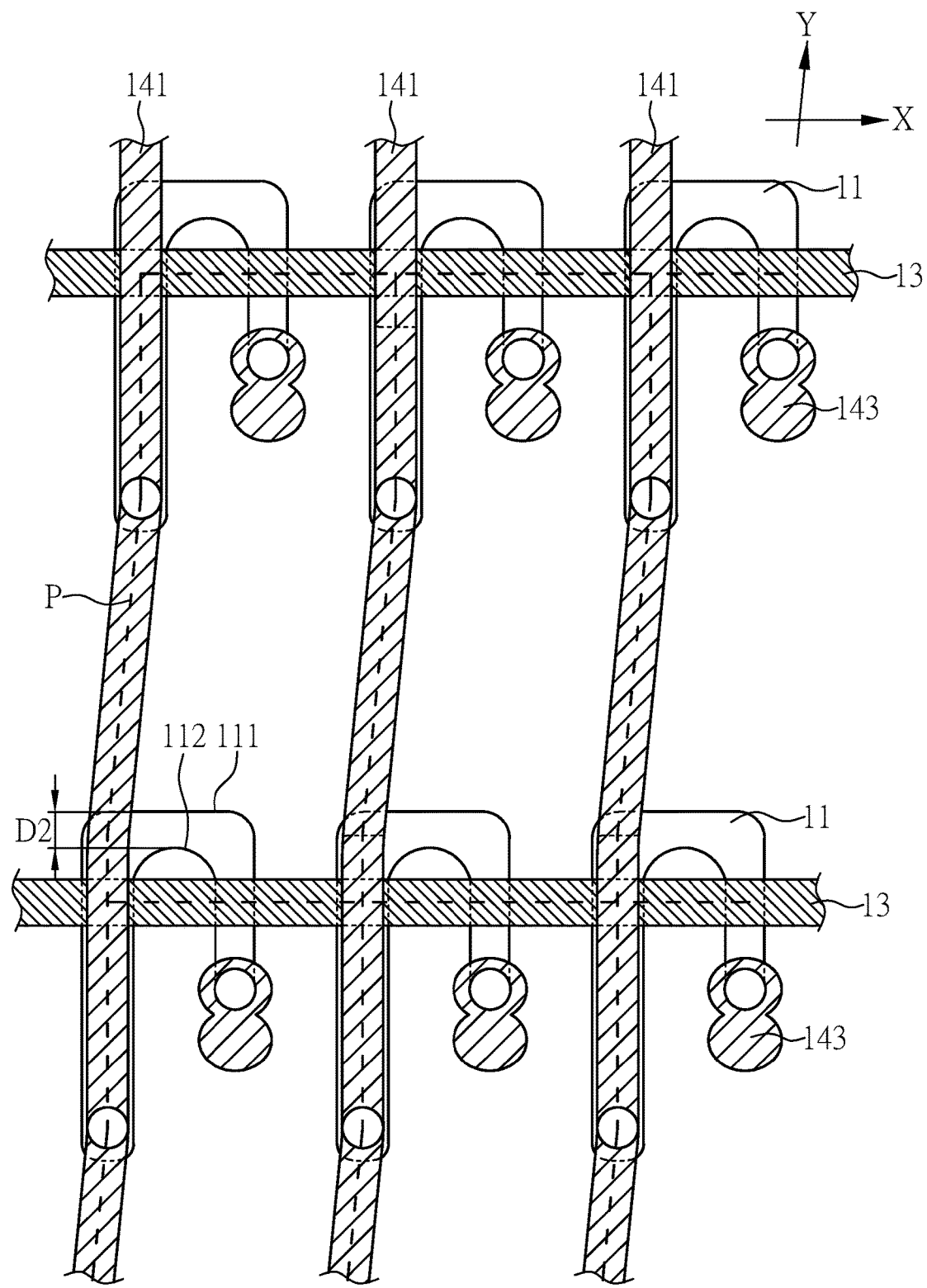
FIG. 8 is a top view of the elements on the substrate of a display device of Example 3 of the present disclosure.
Figure 9:
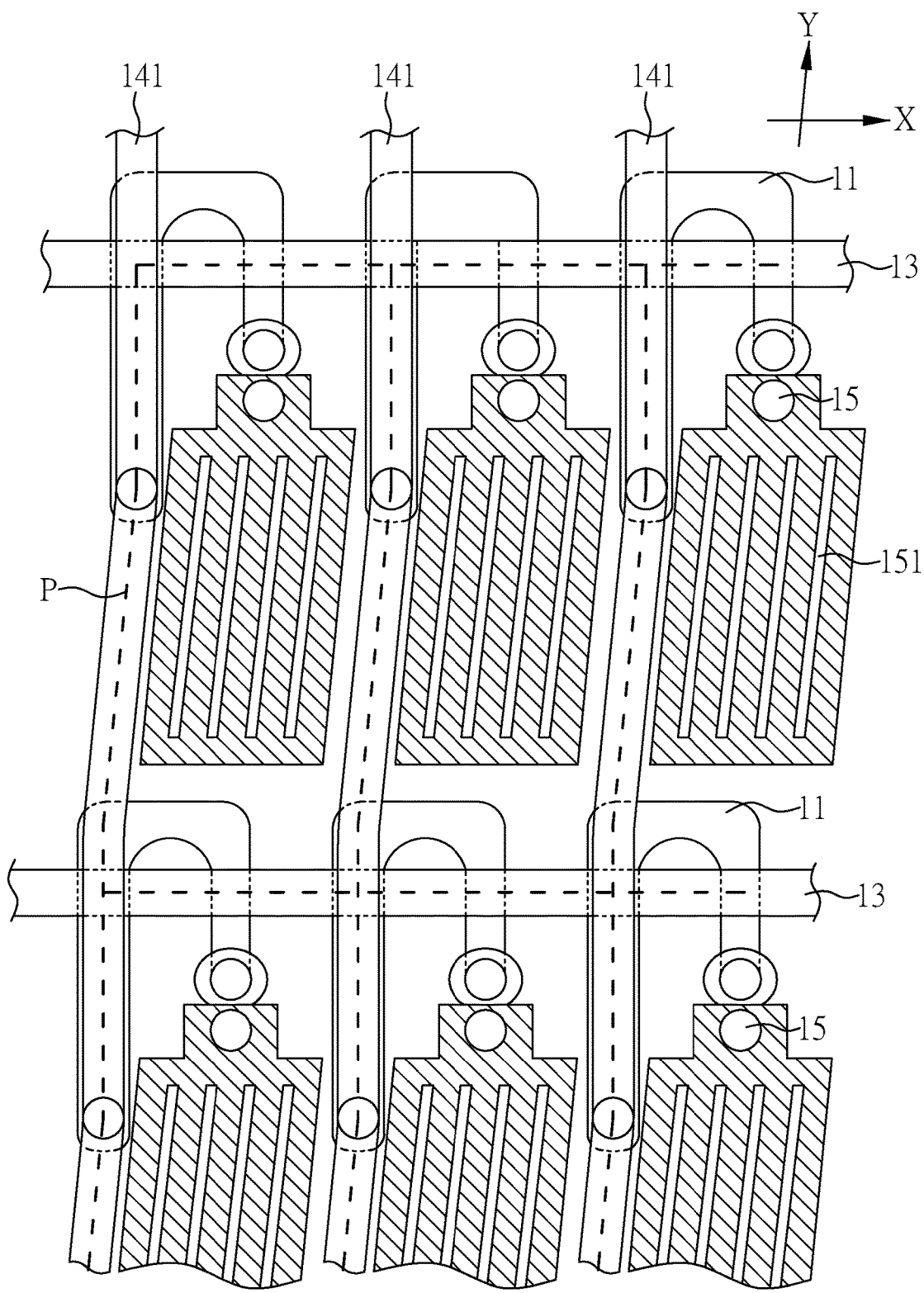
FIG. 9 is a top view of the elements on the substrate of a display device of Example 3 of the present disclosure.
Figure 10:
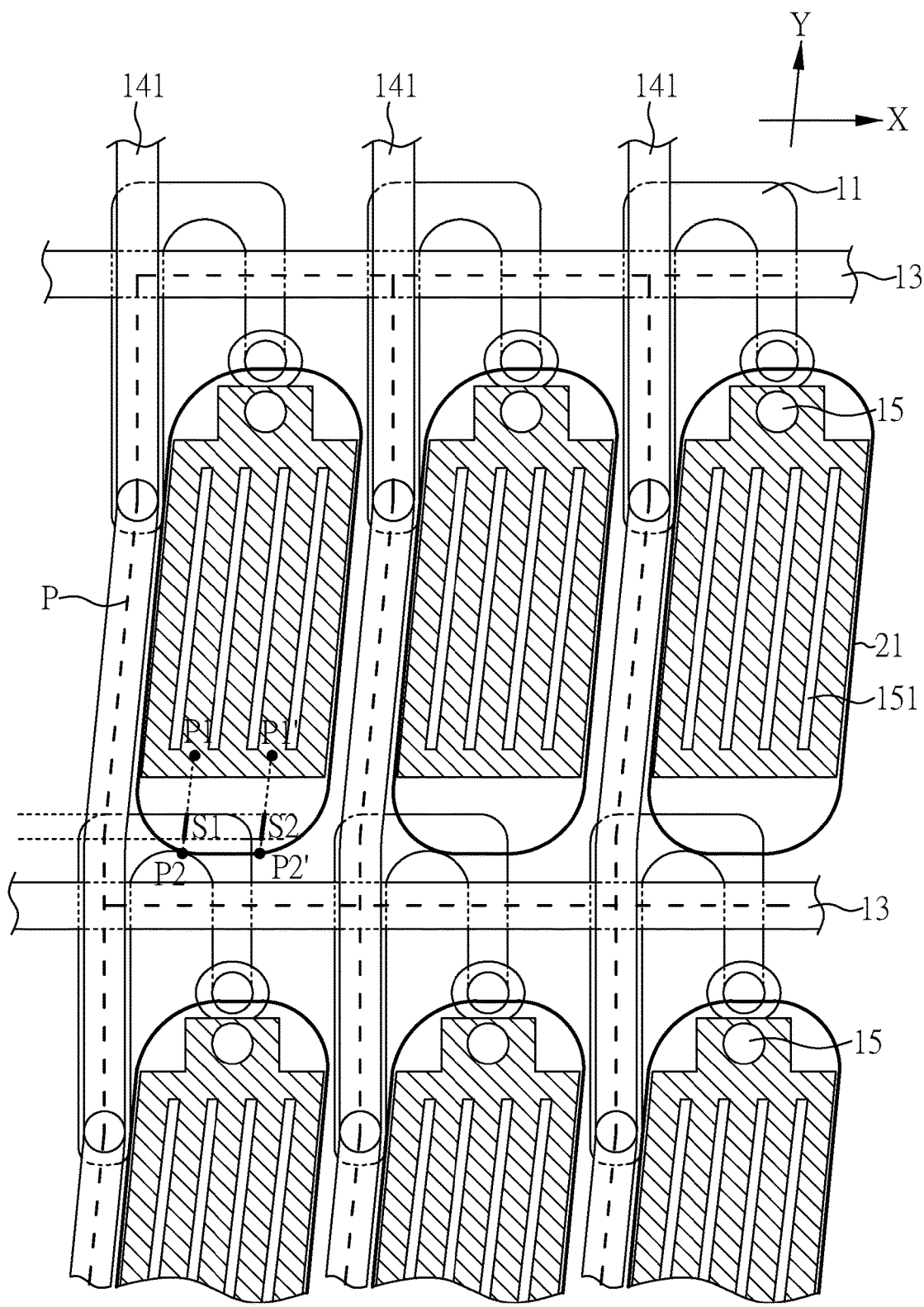
FIG. 10 is a top view of the elements on the substrate and the black matrix layer on the counter substrate of a display device of Example 3 of the present disclosure.

Please refer to FIG. 8, FIG. 9, and FIG. 10. FIG. 8 and FIG. 9 are top views of the elements on the substrate of a display device of the present example. FIG. 10 is a top view of the elements on the substrate and the black matrix layer on the counter substrate of a display device of the present example. Herein, FIGS. 8-10 and FIGS. 5-7 of Example 2 are the same views, respectively.

Comparing FIGS. 5-7 of Example 2 and FIGS. 8-10 of the present example, the display devices and the display devices of Example 2 and that of the present example are similar except of the following. The display device of Example 2 comprises the patterned light shielding layer 12 (as shown in FIG. 5). However, the display device of the present example does not comprise the patterned light shielding layer 12. In addition, in the present example, as shown in FIG. 8, a minimum distance D2 between the semiconductor layer edges 111, 112 may be between 2 μm and 10 μm.

Test Example 1

In the present test example, the display device of Example 1 is used for testing. Herein, as shown in FIG. 4, under maximum grayscale level, a light is provided to pass through the display device and the brightness of any points in the opening 21 of the black matrix layer to the periphery of the opening 21 of the black matrix layer extending along the second direction Y is measured. The so-called "maximum grayscale level" refers to a state when a maximum voltage is applied to make the pixel regions P to be fully bright.

More specifically, as shown in FIG. 4, points P1, P1', P2 and P2' are defined in the pixel region P; wherein the points P1 and P1' locate on the pixel electrode 15 in the opening 21, and the points P2 and P2' locate on the periphery of the opening 21. However, the locations of the points P1, P1' P2 and P2' are not particularly limited, as long as a first reference line connected from the point P1 to the point P2 and a second reference line connected from the point P1' to the point P2' satisfy the following definitions.

Herein, the first reference line connected from the point P1 to the point P2 is in the pixel region P and substantially parallel to the second direction Y. The first reference line connected from the point P1 to the point P2 has a first section S1 overlapped with the semiconductor layer 11. The second reference line connected from the point P1' to the point P2' is in the pixel region P and substantially parallel to the second direction Y. The second reference line connected from the point P1' to the point P2' has a second section S2 that does not overlap with the semiconductor layer 11. Each of the first section S1 and the second section S2 has a same distance D3 from the first gate line 13. A length of the first section S1 equals to a length of the second section S2.

In the present disclosure, the first gate line 13 is close to the pixel region P, and the first gate line can overlap or not overlap with the pixel region P. The second section S2 locates between the semiconductor layer 111 and the first data line 141, or a distance between the second section S2 and the first data line can be between 1 μm and 10 μm.

In the present disclosure, "the first/second reference line is substantially parallel to the second direction Y" means that the first/second reference line is completely parallel to the second direction Y or an angle included between the first/second reference line and the second direction Y is between 0 degree and ±5 degree.

A brightness of the first reference line from the point P1 to the point P2 and a brightness of the second reference line from the point P1' to the point P2' are measured. Herein, the second direction Y is the lengthwise direction of the slits 151 of the pixel electrode 15. The transparency of the semiconductor layer 11 is 60%. However, the transparency of the semiconductor layer 11 is not limited thereto.

Figure 11:
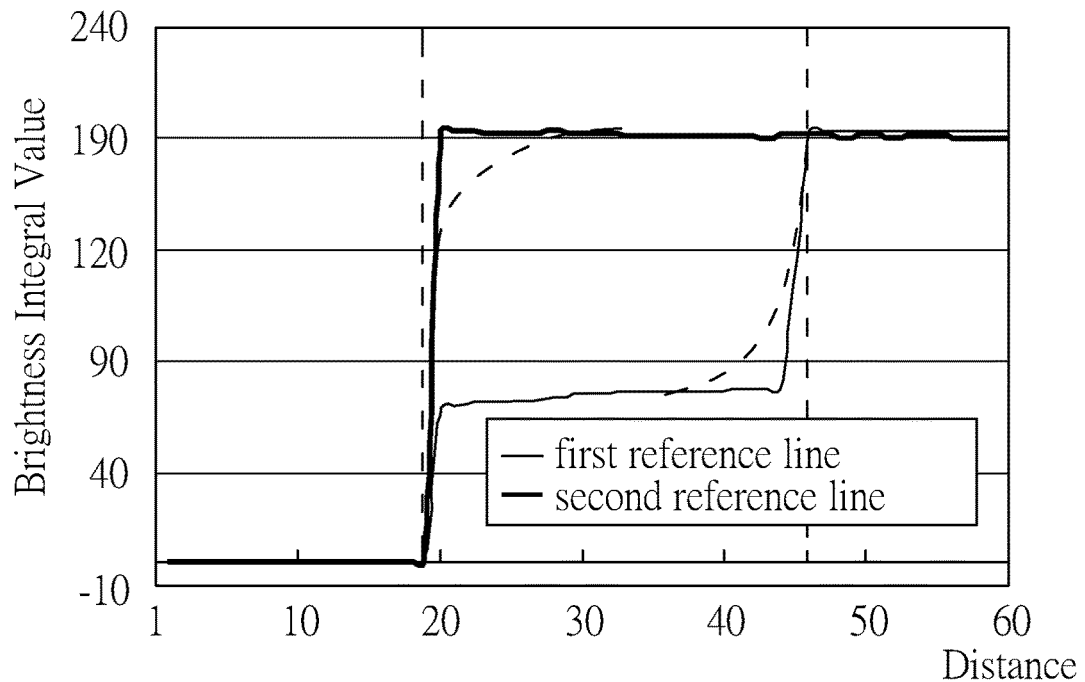
FIG. 11 shows the result of the brightness measurement of Test Example 1.

Please refer to FIG. 11. FIG. 11 shows the result of the brightness measurement of the present test example. As shown in FIG. 11, the horizontal axis represents the relative measurement positions of the first reference line (the line connected from the point P1 to the point P2) and the second reference line (the line connected from the point P1' to the point P2') on the measurement instrument, respectively. The horizontal axis does not represent actual distances. More specifically, during the measurement process to obtain the result shown in FIG. 11, the first reference line connected from the point P1 to the point P2 is divided into 60 equivalent parts to measure grayscale brightness from the point P1 to the point P2. Since the measurement process of the second reference line connected from the point P1' to the point P2' is the same as described above, its description will not be repeated here again. Integration of the grayscale brightness from the point P1 to the point P2 and the grayscale brightness from point the P1' to point the P2' is performed next to obtain the result as shown in FIG. 11. As shown in FIG. 11, the region in between the two dashed lines parallel to the vertical axis is the first section 1 and the second section 2 shown in FIG. 4. However, the positions of the points P1, P2, P1', P2' are not limited to the positions shown in FIG. 4. As long as the first section S1 and the second section S2 meet the aforesaid definitions, these positions may be changed according to different measurement instruments and means used. For example, the points P1, P1' may be positioned at the center of the opening 21 and the points P2, P2' may be positioned at the periphery of the opening 21. Nonetheless, the present disclosure is not limited thereto.

As shown in FIG. 11, the first brightness integral value of the first section S1 of the first reference line (the line connected from the point P1 to the point P2) is significantly smaller than the second brightness integral value of the second section S2 of the second reference line (the line connected from the point P1' to the point P2'). If the first brightness integral value of the first section S1 of the first reference line (the line connected from the point P1 to the point P2) is represented by A1 and the second brightness integral value of the second section S2 of the second reference line (the line connected from the point P1' to the point P2') is represented by A2, then the result of the calculation using the following formula (1) will be:

$$(A2-A1)/A2 \approx 60\% \tag{1}$$

This result is almost consistent with the 60% transparency of the semiconductor layer 11 of the display device used in the present test example. Thus, by adjusting the transparency of the semiconductor layer 11, the relative relationship of the brightness integral values of the first section S1 and the second section S2 can be adjusted as well.

Test Example 2

In the present test example, the display device of Example 1 is used for testing. The front view transmittance and contrast of the entire pixel region when the transparency of the semiconductor layer 11 shown in FIG. 4 is adjusted from 0% to 100% are measured. Vertically adjacent pixels regions are pixel units of the same color. When the transparency of the semiconductor layer 11 is 0%, no light can pass through the semiconductor layer 11. When the transparency of the semiconductor layer 11 is 100%, light can pass through the semiconductor layer 11 completely. Herein, by adjusting the energy distribution of the laser beam used in the manufacturing steps of laser annealing of the semiconductor layer 11, the alignment states of crystallization of the semiconductor layer 11 can be adjusted. Thereby, semiconductor layers 11 with different transparencies can then be obtained.

Figure 12:
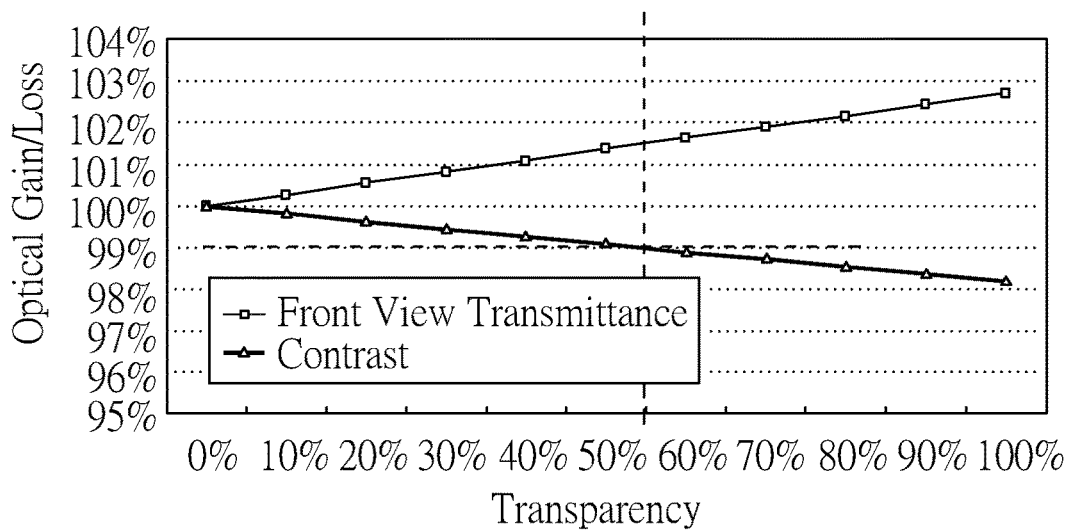
FIG. 12 shows the result of the brightness measurement of Test Example 2.

Please refer to FIG. 12. FIG. 12 shows the result of the brightness measurement of the present example. As shown in FIG. 12, as the transparency increases, the front view transmittance increases while the contrast decreases. As shown in FIG. 4, mura can occur easily at regions near the semiconductor layer 11 due to liquid crystal irregular arrangement. If the semiconductor layer 11 can cover some mura, the contrast can then be increased. However, the front view transmittance will be decreased at the same. Herein, when the transparency of the semiconductor layer 11 is between 0% (light blocked completely) and 100% (light transmitted completely), the front view transmittance can be increased in a range in which the contrast can be decreased to a tolerable level. For example, the tolerable level in which the contrast can be decreased to is 1%.

As shown in FIG. 12, the transparency of the semiconductor layer 11 that can result in good front view transmittance and contrast is greater than 0% but less than 60%. The 60% transparency of the semiconductor layer 11 is almost consistent with the value calculated using $(A2-A1)/A2$ shown in Test Example 1. Hence, in order to achieve good front view transmittance and contrast at the same time, the display device of the present disclosure needs to meet the following formula (2):

$$0 < (A2-A1)/A2 < 0.6 \qquad (2).$$

After converting formula (2), the following formula (3) can be obtained:

$$0.4 < A1/A2 < 1 \qquad (3).$$

As formula (3) shows, to achieve good front view transmittance and contrast at the same time, a ratio (A1/A2) of the first brightness integral value A1 to the second brightness integral value A2 of the display device of the present disclosure needs to be greater than 0.4 but less than 1. For example, the ratio (A1/A2) of the first brightness integral value A1 to the second brightness integral value A2 is greater than 0.6 but less than 0.8.

Test Example 3

Figure 13A:
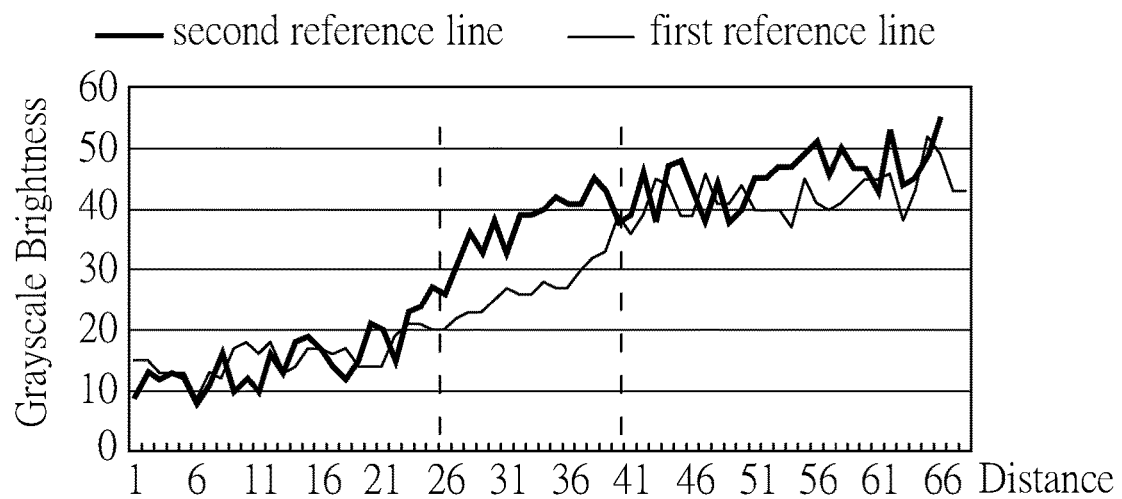
FIGS. 13A-13C show the results of the brightness measurements of Test Example 3.
Figure 13B:
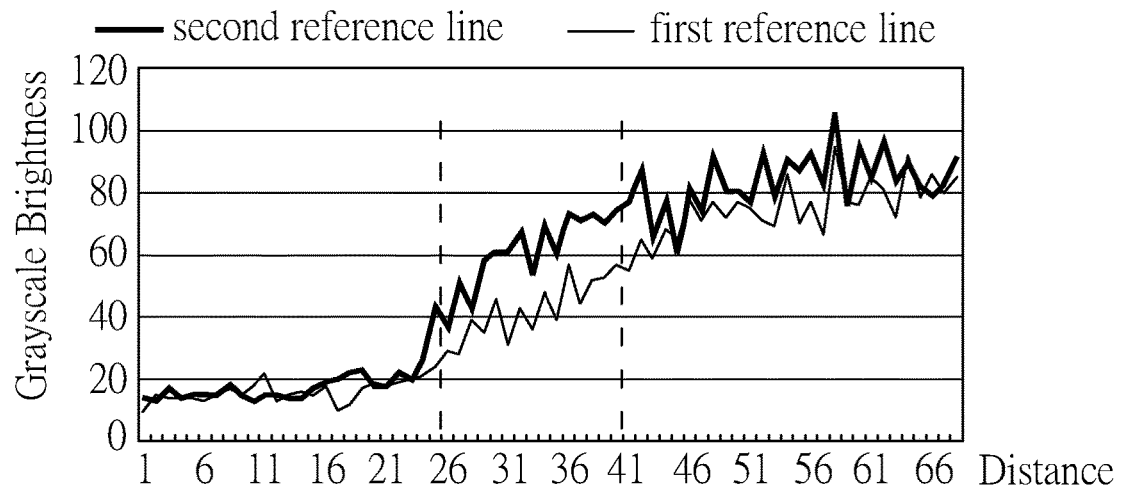
Figure 13C:
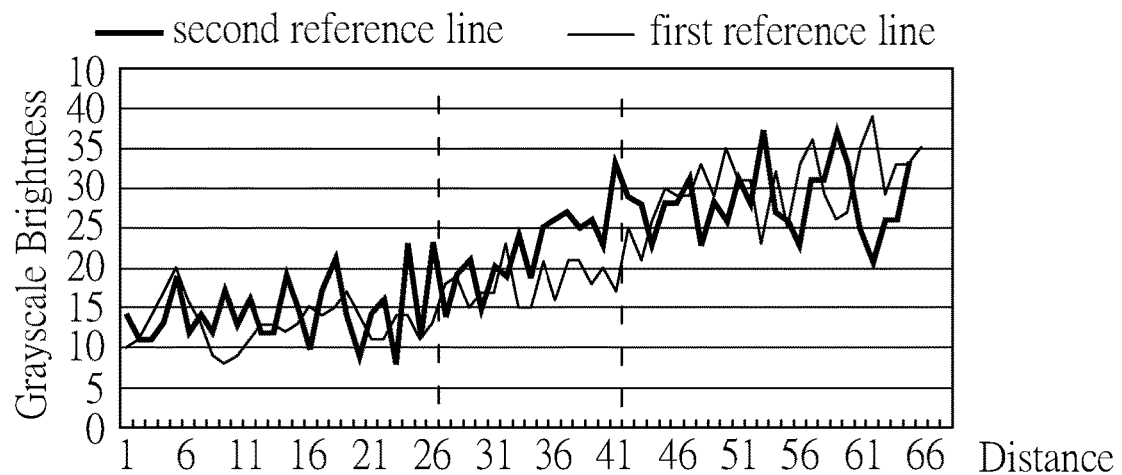

Please refer to FIGS. 13A-13C. FIGS. 13A-13C show the results of the brightness measurements of the present test example. Specifically, FIGS. 13A-13C show the results of the measurements of a red pixel region, a green pixel region, and a blue pixel region of the display device of Example 1, respectively. The transparencies of the semiconductor layers in the red pixel region, the green pixel region, and the blue pixel region are approximately 29%, 30%, and 26%, respectively. Vertically adjacent pixel regions are pixel units of the same color. The measurements of the present test example and that of test example 1 are the same. Since the definitions of the horizontal axes shown in FIGS. 13A-13C are the same as that shown in FIG. 11, their description will not be repeated here again. The grayscale brightness represented by the vertical axes shown in FIGS. 13A-13C are relative values of brightness.

Please refer to FIG. 4 at the same time. During the measurement process to obtain the result shown in FIG. 13A, the first reference line connected from the point P1 to the point P2 is divided into the number of equivalent parts as indicated by the horizontal axis to measure grayscale brightness from the point P2 to the point P1. Since the measurement processes of the second reference line connected from the point P2' to the point P1' and that of FIGS. 13B and 13C are the same as described above; their descriptions will not be repeated here again. As shown in FIGS. 13A-13C, the regions in between the two dashed lines parallel to the vertical axes are the first section 1 and the second section 2 shown in FIG. 4.

As shown in FIGS. 13A-13C, the first brightness integral values of the first sections S1 are all smaller than the second brightness integral values of the second sections S2 for the red pixel region, the green pixel region, and the blue pixel region. In addition, the difference between the first brightness integral values A1 and the second brightness integral values A2 in the red pixel region, the green pixel region, and the blue pixel region are 29.78%, 30.86%, and 26.32% respectively, which are almost consistent with the transparencies of the semiconductor layers in the red pixel region, the green pixel region.

Test Example 4

Figure 14A:
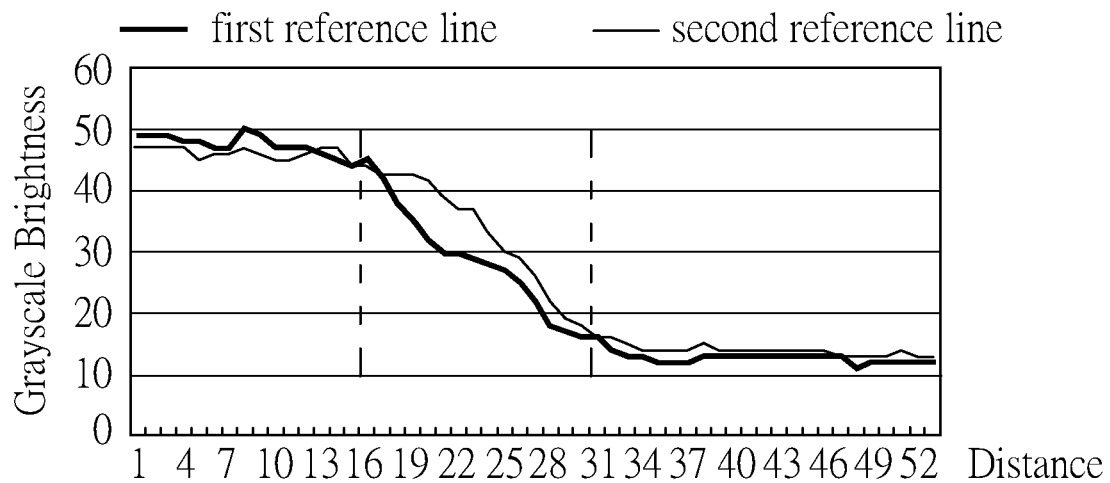
FIGS. 14A-14C show the results of the brightness measurements of Test Example 4.
Figure 14B:
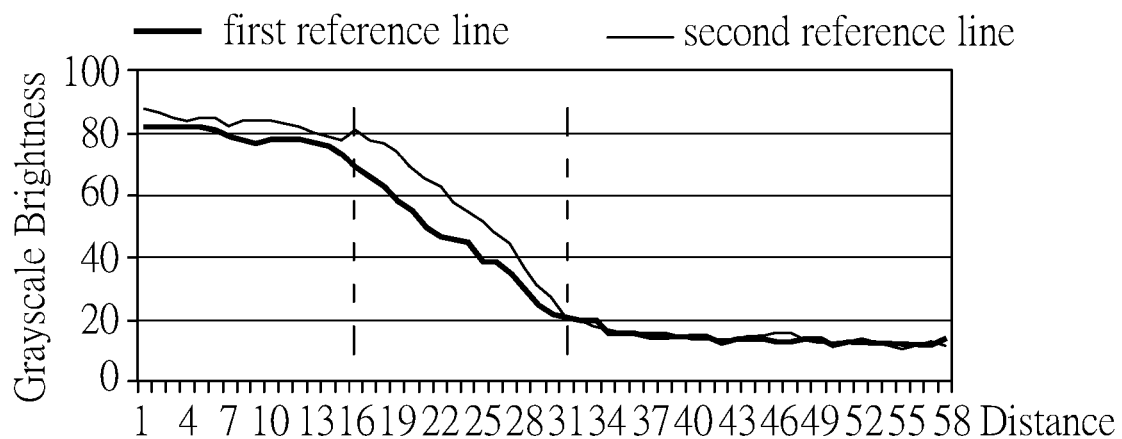
Figure 14C:
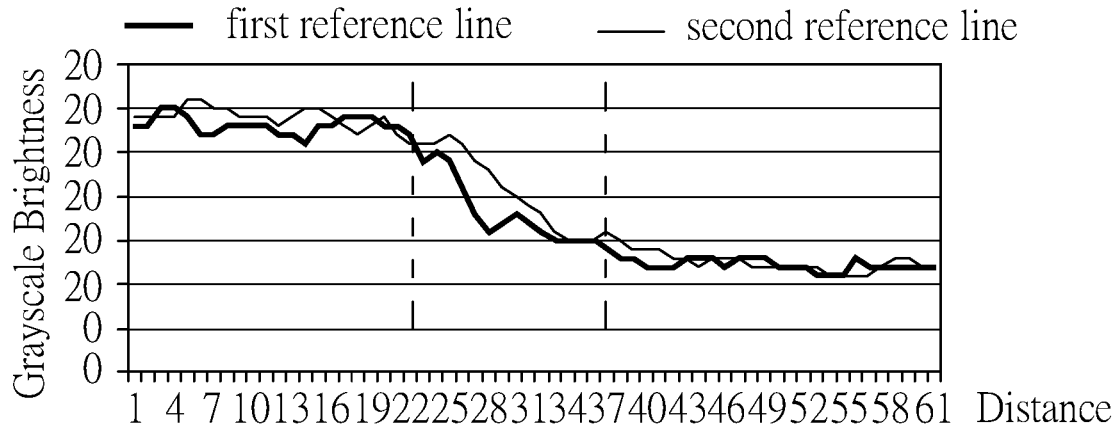

Please refer to FIGS. 14A-14C. FIGS. 14A-14C show the results of the brightness measurements of the present test example. Specifically, FIGS. 14A-14C show the results of the measurements of a red pixel region, a green pixel region, and a blue pixel region of the display device of Example 2, respectively. The transparencies of the semiconductor layers in the red pixel region, the green pixel region, and the blue pixel region are approximately 18%, 19%, and 19%, respectively. Vertically adjacent pixel regions are pixel units of the same color. The measurements of the present test example and that of test example 1 are the same. Since the definitions of the horizontal axes shown in FIGS. 14A-14C are the same as that shown in FIG. 11, their descriptions will not be repeated here again. The grayscale brightness represented by the vertical axes shown in FIGS. 14A-14C are relative values of brightness.

Please refer to FIG. 7 at the same time. During the measurement process to obtain the result shown in FIG. 14A, the first reference line connected from the point P1 to the point P2 is divided into the number of equivalent parts as indicated by the horizontal axis to measure grayscale brightness from the point P1 to the point P2. Since the measurement processes of the second reference line connected from the point P1' to point P2' and that of FIGS. 14B and 14C are the same as described above; their descriptions will not be repeated here again. As shown in FIGS. 14A-14C, the regions in between the two dashed lines parallel to the vertical axes are the first section 1 and the second section 2 shown in FIG. 7.

As shown in FIGS. 14A-14C, the first brightness integral values of the first sections S1 are all smaller than the second brightness integral values of the second sections S2 for the red pixel region, the green pixel region, and the blue pixel region. In addition, the difference between the first brightness integral values A1 and the second brightness integral values A2 in the red pixel region, the green pixel region, and the blue pixel region are 18.98%, 19.79%, and 19.15% respectively, which are almost consistent with the transparencies of the semiconductor layers in the red pixel region, the green pixel region.

Test Example 5

Figure 15A:
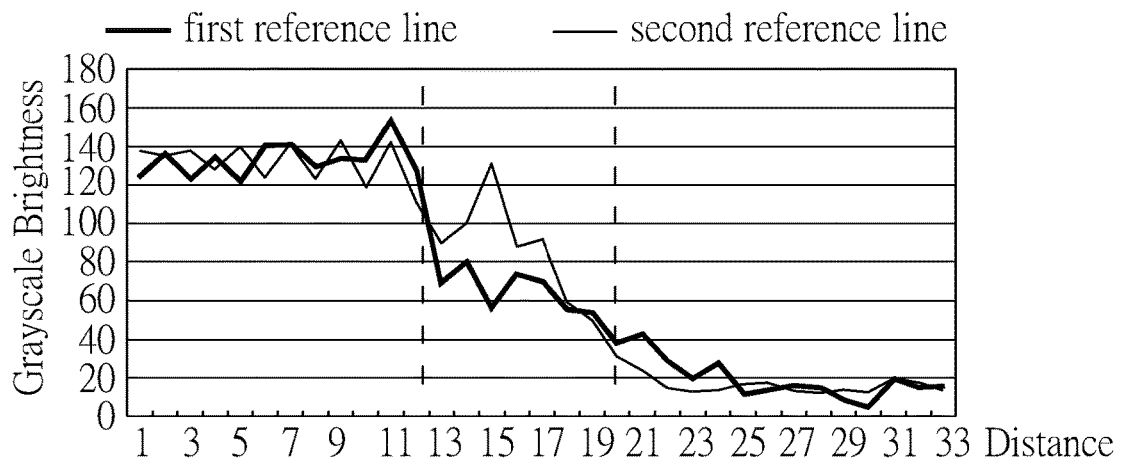
FIGS. 15A-15C show the results of the brightness measurements of Test Example 5.
Figure 15B:
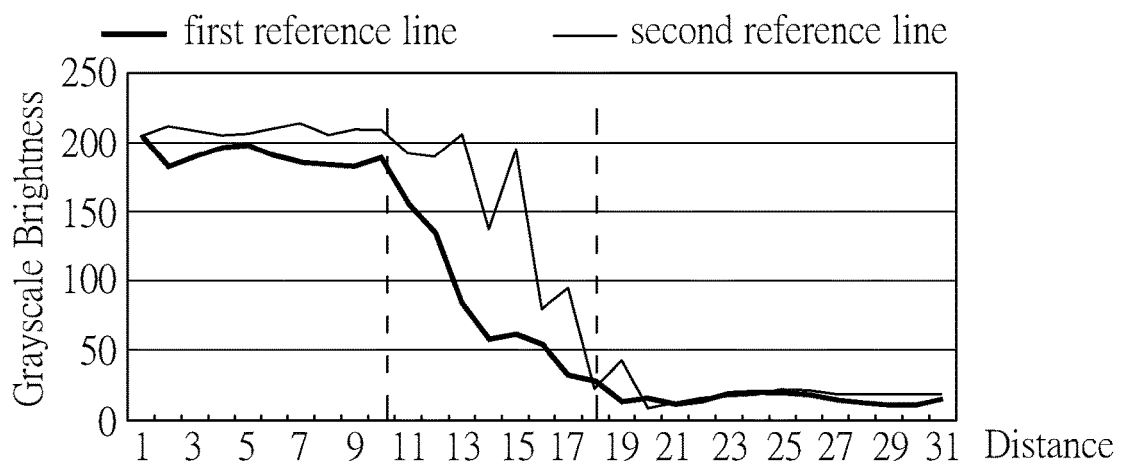
Figure 15C:
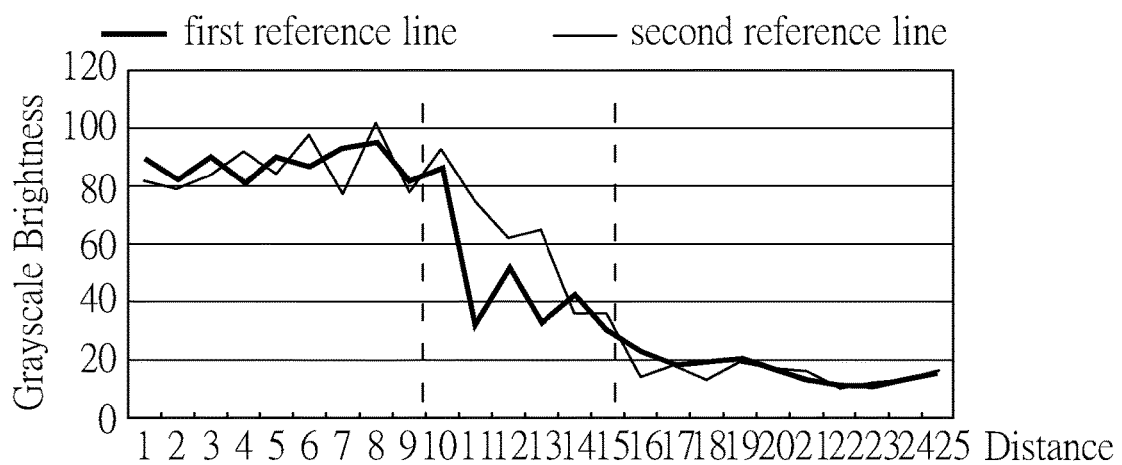

Please refer to FIGS. 15A-15C. FIGS. 15A-15C show the results of the brightness measurements of the present test example. Specifically, FIGS. 15A-15C show the results of the measurements of a red pixel region, a green pixel region, and a blue pixel region of the display device of Example 3, respectively. The transparencies of the semiconductor layers in the red pixel region, the green pixel region, and the blue pixel region are approximately 27%, 50%, and 31%, respectively. Vertically adjacent pixel regions are pixel units of the same color. The measurements of the present test example and that of test example 1 are the same. Since the definitions of the horizontal axes shown in FIGS. 15A-15C are the same as that shown in FIG. 11, their descriptions will not be repeated here again. The grayscale brightness represented by the vertical axes shown in FIGS. 15A-15C are relative values of brightness.

Please refer to FIG. 10 at the same time. During the measurement process to obtain the result shown in FIG. 15A, the first reference line connected from the point P1 to the point P2 is divided into the number of equivalent parts as indicated by the horizontal axis to measure grayscale brightness from point the P1 to the point P2. Since the measurement processes of the second reference line connected from the point P1' to the point P2' and that of FIGS. 15B and 15C are the same as described above; their descriptions will not be repeated here again. As shown in FIGS. 15A-15C, the regions in between the two dashed lines parallel to the vertical axes are the first section 1 and the second section 2 shown in FIG. 10.

As shown in FIGS. 15A-15C, the first brightness integral values of the first sections S1 are all smaller than the first brightness integral values of the second sections S2 for the red pixel region, the green pixel region, and the blue pixel region. In addition, the difference between the first brightness integral values A1 and the second brightness integral values A2 in the red pixel region, the green pixel region, and the blue pixel region are 27.32%, 50.20%, and 31.53% respectively, which are almost consistent with the transparencies of the semiconductor layers in the red pixel region, the green pixel region.

Herein, the first brightness integral values of the first sections S1 (i.e. the first brightness integral value A1 described in Test Example 1) and the second brightness integral values of the second sections S2 (i.e. the second brightness integral value A2 described in Test Example 1) are calculated from the results of the measurements of Test Examples 3-5 shown in FIGS. 13A to 15C. Ratios of the first brightness integral value to the second brightness integral value are calculated next. For the display device in Text Example 3, the difference between the first brightness integral values A1 and the second brightness integral values A2 in the red pixel region, the green pixel region, and the blue pixel region are 29.78%, 30.86%, and 26.32% respectively. For the display device in Test Example 4, the difference between the first brightness integral values A1 and the second brightness integral values A2 in the red pixel region, the green pixel region, and the blue pixel region are 18.98%, 19.79%, and 19.15% respectively. For the display device in Example 5, the difference between the first brightness integral values A1 and the second brightness integral values A2 in the red pixel region, the green pixel region, and the blue pixel region are 27.32%, 50.20%, and 31.53% respectively. These results are summarized in FIG. 16.

Figure 16:
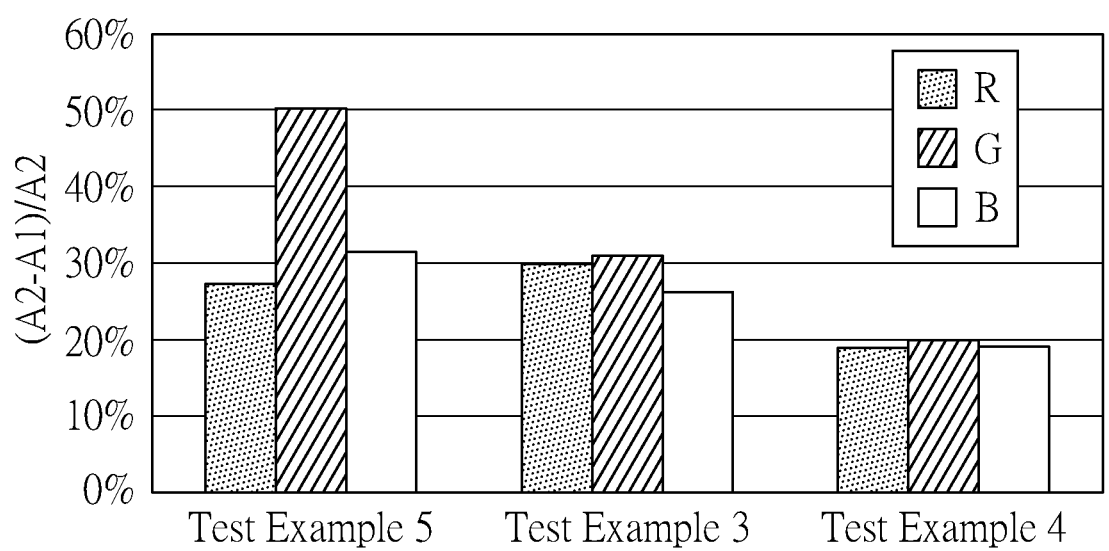
FIG. 16 shows the comparison between the ratios of the first brightness integral value to the second brightness integral value of Test Examples 3, 4, and 5.

As shown in FIG. 16, in Test Examples 3-5, by adjusting the transparency of the semiconductor layer in the green pixel region to be greater than the transparencies of the semiconductor layers in the red pixel region and the blue pixel region, the A1/A2 ratio of the green pixel region will be greater than the A1/A2 ratios of the red pixel regions and the blue pixel regions.

Figure 17:
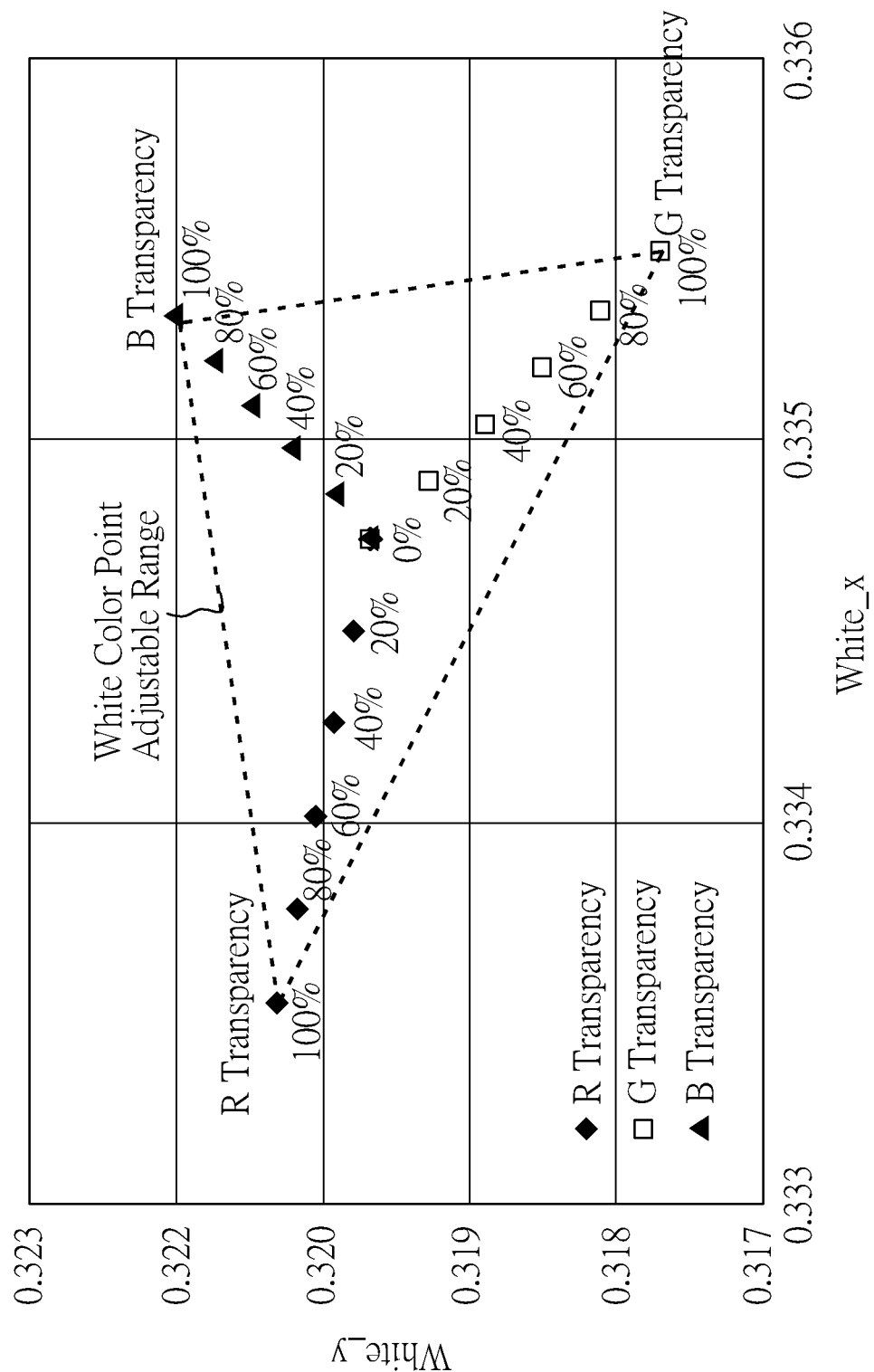
FIG. 17 shows the relationship between the transparencies of semiconductor layers and the positions of white color points in pixel regions of different colors.

Since the human eye is most sensitive to the brightness of green color; by adjusting the transparencies of the semiconductor layers in the green pixel regions to be the highest in Test Examples 3-5, the brightness of the green pixel regions can be increased. In addition, as shown by the results of Test Examples 3 to 5, by adjusting the transparencies of the semiconductor layers in the pixel regions, the brightness of pixel regions of different colors can be adjusted, thereby adjusting the positions of white points as shown in FIG. 17. Since blue color can adjust color points of cold colors, but not all display devices need to have color points of cold colors, thereby the transparency of the semiconductor layer of the blue pixel region is less than the transparency of the semiconductor layer of the green pixel region.

In the present disclosure, the display device may further comprise a display medium on the substrate, which can be a liquid crystal layer, an organic light emitting layer or micro light emitting diodes. When the display medium is a liquid crystal layer, the display device is a liquid crystal device (LCD). When the display medium is an organic light emitting layer, the display device is an organic light emitting device (OLED). When the display medium is micro light emitting diodes, the display device is a micro light emitting diode device (micro-LED display).

In addition, in the present disclosure, when the substrate used in the display device is plastic, flexible materials or thin films, the display device is a flexible display device, for example, a flexible LCD, a flexible OLED or a flexible micro-LED display.

In the present disclosure, the display devices manufactured in the aforesaid examples may also be used with any touch panels together to form touch display devices. The display devices or the touch display devices manufactured in the aforesaid examples of the present disclosure may be used in any electronic devices requiring display screens known in the present technical field. For example, monitors, mobile phones, laptop computers, video cameras, cameras, music players, mobile navigation devices, televisions, and the likes.

Although the present disclosure has been explained in relation to its examples, it is to be understood that many other possible modifications and variations can be made without departing from the spirit and scope of the present disclosure as hereinafter claimed.

What is claimed is:
1. A display device, comprising:
a substrate;
a counter substrate disposed opposite to the substrate;
a semiconductor layer disposed on the substrate, wherein a transparency of the semiconductor layer is greater than 0% and less than 60%;
a first insulation layer disposed on the semiconductor layer;
a first electrode layer disposed on the first insulation layer, wherein the first electrode layer has plural first gate lines extending along a first direction;
a second insulation layer disposed on the first electrode layer;
a second electrode layer disposed on the second insulation layer, wherein the second electrode layer has plural first data lines extending along a second direction, and the first direction and the second direction are different;
a plurality of pixel regions defined by the first gate lines and the first data lines; and
a black matrix layer disposed between the substrate and the counter substrate;
wherein a first reference line and a second reference line are defined to be located in one of the pixel regions, the first reference line and the second reference line are substantially parallel to the second direction respectively;

wherein the first reference line is defined to have a first section overlapped with the semiconductor layer, the second reference line is defined to have a second section not overlapped with the semiconductor layer, each of the first section and the second section has a same distance from the first gate line, and a length of the first section is equal to a length of the second section;

wherein the black matrix layer has plural openings, and the first section and the second section are overlapped with one of the plural openings;

wherein the first section corresponds to a first section brightness and the second section corresponds to a second section brightness, the first section brightness has a first brightness value and the second section brightness has a second brightness value, and a ratio of the first brightness value to the second brightness value is greater than 0.4 and less than 1; and wherein the pixel regions comprise a green pixel region and a blue pixel region, and a ratio of the first brightness value of the green pixel region to the second brightness value of the green pixel region is greater than a ratio of the first brightness value of the blue pixel region to the second brightness value of the blue pixel region.

2. The display device as claimed in claim 1, wherein the pixel regions further comprise a red pixel region, and the ratio of the first brightness value of the green pixel region to the second brightness value of the green pixel region is greater than a ratio of the first brightness value of the red pixel region to the second brightness value of the red pixel region.

3. The display device as claimed in claim 1, wherein the ratio of the first brightness value to the second-brightness value is greater than 0.6 and less than 0.8.

4. The display device as claimed in claim 1, further comprising a patterned light shielding layer disposed between the substrate and the semiconductor layer.

5. The display device as claimed in claim 4, wherein the patterned light shielding layer is overlapped with the semiconductor layer partially.

6. The display device as claimed in claim 5, wherein the semiconductor layer has a semiconductor layer edge, the patterned light shielding layer has a light shielding edge, and a distance between the semiconductor layer edge and the light shielding edge is between 2 μm and 10 μm.

7. A display device, comprising:
a substrate;
a counter substrate disposed opposite to the substrate;
a semiconductor layer disposed on the substrate, wherein a transparency of the semiconductor layer is greater than 0% and less than 60%;
a first insulation layer disposed on the semiconductor layer;
a first electrode layer disposed on the first insulation layer, wherein the first electrode layer has plural first gate lines extending along a first direction;
a second insulation layer disposed on the first electrode layer;
a second electrode layer disposed on the second insulation layer, wherein the second electrode layer has plural first data lines extending along a second direction, and the first direction and the second direction are different;
a plurality of pixel regions defined by the first gate lines and the first data lines; and
a black matrix layer disposed between the substrate and the counter substrate;

wherein one of the pixel regions is defined to have a first section and a second section, the first section is substantially parallel to the second direction and the first section overlaps with the semiconductor layer, the second section is substantially parallel to the second direction and the second section does not overlap with the semiconductor layer, each of the first section and the second section has a same distance from the first gate lines, and a length of the first section is equal to a length of the second section;

wherein the black matrix layer has plural openings, and the first section and the second section are overlapped with one of the plural openings;

wherein the first section corresponds to a first section brightness and the second section corresponds to a second section brightness, the first section brightness has a first brightness value and the second section brightness has a second brightness value, and a ratio of the first-brightness value to the second brightness value is greater than 0.4 and less than 1; and wherein the pixel regions comprise a green pixel region and a blue pixel region, and a ratio of the first brightness value of the green pixel region to the second brightness value of the green pixel region is greater than a ratio of the first brightness value of the blue pixel region to the second brightness value of the blue pixel region.

8. The display device as claimed in claim 7, wherein the pixel regions further comprise a red pixel region, and the ratio of the first brightness value of the green pixel region to the second brightness value of the green pixel region is greater than a ratio of the first brightness value of the red pixel region to the second brightness value of the red pixel region.

9. The display device as claimed in claim 7, wherein the ratio of the first brightness value to the second brightness value is greater than 0.6 and less than 0.8.

10. A display device, comprising:
a substrate;
a counter substrate disposed opposite to the substrate;
a patterned light shielding layer disposed on the substrate;
a semiconductor layer disposed on the patterned light shielding layer, wherein the semiconductor layer is overlapped with the patterned light shielding layer partially, and a transparency of the semiconductor layer is greater than 0% and less than 60%;
a first insulation layer disposed on the semiconductor layer;
a first electrode layer disposed on the first insulation layer, wherein the first electrode layer has plural first gate lines extending along a first direction;
a second insulation layer disposed on the first electrode layer;
a second electrode layer disposed on the second insulation layer, wherein the second electrode layer has plural first data lines extending along a second direction, and the first direction and the second direction are different;
a plurality of pixel regions defined by the first gate lines and the first data lines; and
a black matrix layer disposed between the substrate and the counter substrate;

wherein one of the pixel regions is defined to have a first section and a second section, the first section is substantially parallel to the second direction and the first section overlaps with the semiconductor layer but does not overlap with the patterned light shielding layer, the second section is substantially parallel to the second direction and the second section does not overlap with the semiconductor layer and the patterned light shielding layer, each of the first section and the second section has a same distance from the first gate lines, and a length of the first section is equal to a length of the second section;

wherein the black matrix layer has plural openings, and the first section and the second section are overlapped with one of the plural openings;

wherein the first section corresponds to a first section brightness and the second section corresponds to a second section brightness, the first section brightness has a first brightness value and the second section brightness has a second brightness value, and a ratio of the first brightness value to the second brightness value is greater than 0.4 and less than 1; and wherein the pixel regions comprise a green pixel region and a blue pixel region, and a ratio of the first brightness value of the green pixel region to the second brightness value of the green pixel region is greater than a ratio of the first brightness value of the blue pixel region to the second brightness value of the blue pixel region.

11. The display device as claimed in claim 10, wherein the pixel regions further comprise a red pixel region, and the ratio of the first brightness value of the green pixel region to the second brightness value of the green pixel region is greater than a ratio of the first brightness value of the red pixel region to the second brightness value of the red pixel region.

12. The display device as claimed in claim 10, wherein the ratio of the first brightness value to the second brightness value is greater than 0.6 and less than 0.8.

13. The display device as claimed in claim 10, wherein the semiconductor layer has a semiconductor layer edge, the patterned light shielding layer has a light shielding edge, and a distance between the semiconductor layer edge and the light shielding edge is between 2 μm and 10 μm.

* * * * *